United States Patent
Raghavan et al.

(10) Patent No.: US 11,540,171 B2
(45) Date of Patent: Dec. 27, 2022

(54) ASSISTING COMMUNICATIONS OF SMALL DATA PAYLOADS WITH RELAY NODES

(71) Applicant: QUALCOMM Incorporated, San Diego, CA (US)

(72) Inventors: Vasanthan Raghavan, West Windsor Township, NJ (US); Tianyang Bai, Bridgewater, NJ (US); Jung Ho Ryu, Fort Lee, NJ (US); Hua Wang, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 16/904,210

(22) Filed: Jun. 17, 2020

(65) Prior Publication Data
US 2021/0014729 A1    Jan. 14, 2021

Related U.S. Application Data

(60) Provisional application No. 62/873,441, filed on Jul. 12, 2019.

(51) Int. Cl.
*H04W 28/06* (2009.01)
*H04W 84/20* (2009.01)
*H04W 88/04* (2009.01)

(52) U.S. Cl.
CPC ............ *H04W 28/06* (2013.01); *H04W 84/20* (2013.01); *H04W 88/04* (2013.01)

(58) Field of Classification Search
CPC ..... H04W 28/06; H04W 84/20; H04W 88/04; H04W 4/40; H04W 76/025; H04W 52/46;
(Continued)

(56) References Cited

U.S. PATENT DOCUMENTS

| 9,549,405 B2* | 1/2017 | Shu ........................ H04L 5/0096 |
| 2013/0016652 A1* | 1/2013 | Ke ........................ H04W 40/10 |
| | | 370/315 |

(Continued)

FOREIGN PATENT DOCUMENTS

| WO | 2018125686 A2 | 7/2018 |
| WO | 2019010049 A1 | 1/2019 |

OTHER PUBLICATIONS

Condoluci M., et al., "LTE-Direct vs. WiFi-Direct for Machine-Type Communications over LTE-A Systems", 2015 IEEE 26th Annual International Symposium on Personal, Indoor, and Mobile Radio Communications (PIMRC), IEEE, Aug. 30, 2015 (Aug. 30, 2015), XP032822345, pp. 2298-2302, DOI: 10.1109/PIMRC.2015. 7343681 [retrieved on Dec. 1, 2015] Abstract p. 1, Left-Hand Column, Lines 28-41 p. 2, Right-Hand Column, Lines 3-40, Sections III .B and III. C.

(Continued)

*Primary Examiner* — Allahyar Kasraian
(74) *Attorney, Agent, or Firm* — Patterson & Sheridan, LLP

(57) ABSTRACT

Certain aspects of the present disclosure relate to assisting communications with low data payloads with relay nodes. An example method generally includes forming a first cluster with a first wireless node and one or more second wireless nodes, wherein each of the second wireless nodes has a low data rate demand relative to a system bandwidth. The method also includes determining to serve as a relay node for the first cluster, generating a first set of packets for uplink transmission to a base station, receiving a second set of packets from the one or more second wireless nodes, combining the first set of packets and the second set of packets into an uplink payload based on the determination, (Continued)

and transmitting, to the base station, the uplink payload based on the determination.

28 Claims, 9 Drawing Sheets

(58) Field of Classification Search
CPC . H04W 40/22; H04B 7/2606; H04B 7/15528; H04L 5/001
USPC .............................. 370/315, 310.2; 455/12.1
See application file for complete search history.

(56) References Cited

U.S. PATENT DOCUMENTS

| | | | |
|---|---|---|---|
| 2016/0014668 A1* | 1/2016 | Chou | H04W 76/14 455/7 |
| 2016/0021526 A1 | 1/2016 | Niu et al. | |
| 2016/0338095 A1* | 11/2016 | Faurie | H04W 72/14 |
| 2017/0048894 A1* | 2/2017 | Choi | H04W 4/10 |
| 2017/0111754 A1* | 4/2017 | Baghel | H04W 76/27 |
| 2017/0215123 A1* | 7/2017 | Miranda d'Orey | H04W 40/12 |
| 2017/0223753 A1* | 8/2017 | Höglund | H04W 88/04 |
| 2017/0230484 A1* | 8/2017 | Lai | H04L 12/4625 |
| 2017/0347338 A1* | 11/2017 | Chen | H04W 76/14 |
| 2018/0123683 A1* | 5/2018 | Wakabayashi | H04B 7/15528 |
| 2018/0295534 A1* | 10/2018 | Huang | H04W 8/005 |
| 2019/0174411 A1* | 6/2019 | Xu | H04W 72/0406 |
| 2020/0092685 A1* | 3/2020 | Fehrenbach | H04W 4/46 |
| 2020/0351779 A1* | 11/2020 | Sharma | H04W 76/28 |
| 2021/0022104 A1* | 1/2021 | Sundstrom | H04W 52/0287 |
| 2021/0112409 A1* | 4/2021 | Rune | H04L 63/0884 |
| 2021/0160703 A1* | 5/2021 | Luo | H04W 48/10 |

OTHER PUBLICATIONS

International Search Report and Written Opinion—PCT/US2020/038529—ISA/EPO—dated Jan. 25, 2021.
Partial International Search Report—PCT/US2020/038529—ISA/EPO—dated Nov. 18, 2020.
Salam T., et al., "Data Aggregation in Massive Machine Type Communication: Challenges and Solutions", IEEE Access, vol. 7, Apr. 12, 2019 (Apr. 12, 2019), XP011719401, pp. 41921-41946, DOI: 10.1109/ACCESS.2019.2906880 [retrieved on Apr. 10, 2019] p. 7, Left-Hand Column, Line 16—Right-Hand Column, Line 23 p. 10, Left-Hand Column, line 11—p. 14, Left-Hand Column, Line 25.
Tambawal A.B., et al., "Enhanced Weight-Based Clustering Algorithm to Provide Reliable Delivery for VANET Safety Applications", PLOS ONE, vol. 14, No. 4, Jan. 1, 2019 (Jan. 1, 2019), p. e0214664, XP055733604, pp. 1-19, DOI: 10.1371/journal.pone.0214664, p. 6, Line 18—p. 9, Last Line.

* cited by examiner

ASSISTING COMMUNICATIONS OF SMALL DATA PAYLOADS WITH RELAY NODES

CROSS-REFERENCE TO RELATED APPLICATION

The present Application for Patent claims priority to U.S. Provisional Application No. 62/873,441, filed Jul. 12, 2019, which is assigned to the assignee of the present application and hereby expressly incorporated by reference herein in its entirety.

BACKGROUND

Field of the Disclosure

Aspects of the present disclosure relate to wireless communications, and more particularly, to techniques for assisting communications with small data payloads with relay nodes.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include desirable power consumption and/or desirable control and scheduling overhead for wireless communications via a relay node.

Certain aspects provide a method for wireless communication by a first wireless node. The method generally includes forming a cluster with the first wireless node and one or more second wireless nodes, wherein each of the second wireless nodes has a low data rate demand relative to a system bandwidth. The method also includes determining to serve as a relay node for the cluster, generating a first set of packets for uplink transmission to a base station, receiving a second set of packets from the one or more second wireless nodes, combining the first set of packets and the second set of packets into an uplink payload based on the determination, and transmitting, to the base station, the uplink payload based on the determination.

Certain aspects provide a method for wireless communication by a first wireless node. The method generally includes forming a cluster with a second wireless node and the first wireless node, wherein the first wireless node has a low data rate demand relative to a system bandwidth. The method also includes generating packets for uplink transmission to a base station, determining that the second wireless node is serving as a relay node for the cluster, and transmitting the packets to the second wireless node based on the determination.

Certain aspects provide a method for wireless communication by a base station. The method generally includes determining that a first wireless node is serving as a relay node in a cluster including the first wireless node and one or more second wireless nodes, wherein each of the second wireless nodes has a low data rate demand relative to a system bandwidth. The method also includes communicating with the cluster via the first wireless node based on the determination.

Certain aspects provide an apparatus for wireless communication. The apparatus generally includes a processing system configured to form a cluster with the apparatus and one or more first wireless nodes, wherein each of the first wireless nodes has a low data rate demand relative to a system bandwidth, determine to serve as a relay node for the cluster, and generate a first set of packets for uplink transmission to a base station. The apparatus also includes a transceiver configured to receive a second set of packets from the one or more first wireless nodes. The processing system is configured to combine the first set of packets and the second set of packets into an uplink payload based on the determination. The transceiver is configured to transmit, to the base station, the uplink payload based on the determination.

Certain aspects provide an apparatus for wireless communication. The apparatus generally includes a processing system configured to form a cluster with a wireless node and the apparatus, wherein the apparatus has a low data rate demand relative to a system bandwidth, generate packets for uplink transmission to a base station, and determine that the wireless node is serving as a relay node for the cluster. The apparatus also includes a transceiver configured to transmit the packets to the wireless node based on the determination.

Certain aspects provide an apparatus for wireless communication. The apparatus generally includes a processing system configured to determine that a first wireless node is serving as a relay node in a cluster including the first wireless node and one or more second wireless nodes, wherein each of the second wireless nodes has a low data rate demand relative to a system bandwidth. The apparatus also includes a transceiver configured to communicate with the cluster via the first wireless node based on the determination.

Certain aspects provide an apparatus for wireless communication. The apparatus generally includes means for forming a cluster with the apparatus and one or more first wireless nodes, wherein each of the first wireless nodes has a low data rate demand relative to a system bandwidth; means for determining to serve as a relay node for the cluster; means for generating a first set of packets for uplink transmission to a base station; means for receiving a second set of packets from the one or more first wireless nodes; means for combining the first set of packets and the second set of packets into an uplink payload based on the determination; and means for transmitting, to the base station, the uplink payload based on the determination.

Certain aspects provide an apparatus for wireless communication. The apparatus generally includes means for forming a cluster with a wireless node and the apparatus, wherein the apparatus has a low data rate demand relative to a system bandwidth; means for generating packets for uplink transmission to a base station; means for determining that the wireless node is serving as a relay node for the cluster; and means for transmitting the packets to the wireless node based on the determination.

Certain aspects provide an apparatus for wireless communication. The apparatus generally includes means for determining that a first wireless node is serving as a relay node in a cluster including the first wireless node and one or more second wireless nodes, wherein each of the second wireless nodes has a low data rate demand relative to a system bandwidth; and means for communicating with the cluster via the first wireless node based on the determination.

Certain aspects provide a computer readable medium having instructions stored thereon for forming a cluster with a first wireless node and one or more second wireless nodes, wherein each of the second wireless nodes has a low data rate demand relative to a system bandwidth; determining to serve as a relay node for the cluster; generating a first set of packets for uplink transmission to a base station; receiving a second set of packets from the one or more second wireless nodes; combining the first set of packets and the second set of packets into an uplink payload based on the determination; and transmitting, to the base station, the uplink payload based on the determination.

Certain aspects provide a computer readable medium having instructions stored thereon for forming a cluster with a first wireless node and a second wireless node, wherein the first wireless node has a low data rate demand relative to a system bandwidth; generating packets for uplink transmission to a base station; determining that the second wireless node is serving as a relay node for the cluster; and transmitting the packets to the second wireless node based on the determination.

Certain aspects provide a computer readable medium having instructions stored thereon for determining that a first wireless node is serving as a relay node in a cluster including the first wireless node and one or more second wireless nodes, wherein each of the second wireless nodes has a low data rate demand relative to a system bandwidth; and communicating with the cluster via the first wireless node based on the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for communicating with machine-type communication (MTC) devices and/or Internet-of-Things (IoT) devices via a relay node. As the MTC/IoT devices may have small data rate demands relative to a system bandwidth, the MTC/IoT devices may form a cluster with a relay node that forwards uplink traffic to a base station and downlink traffic to the respective MTC/IoT devices as further described herein.

The following description provides examples of wireless communication operations and networks, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
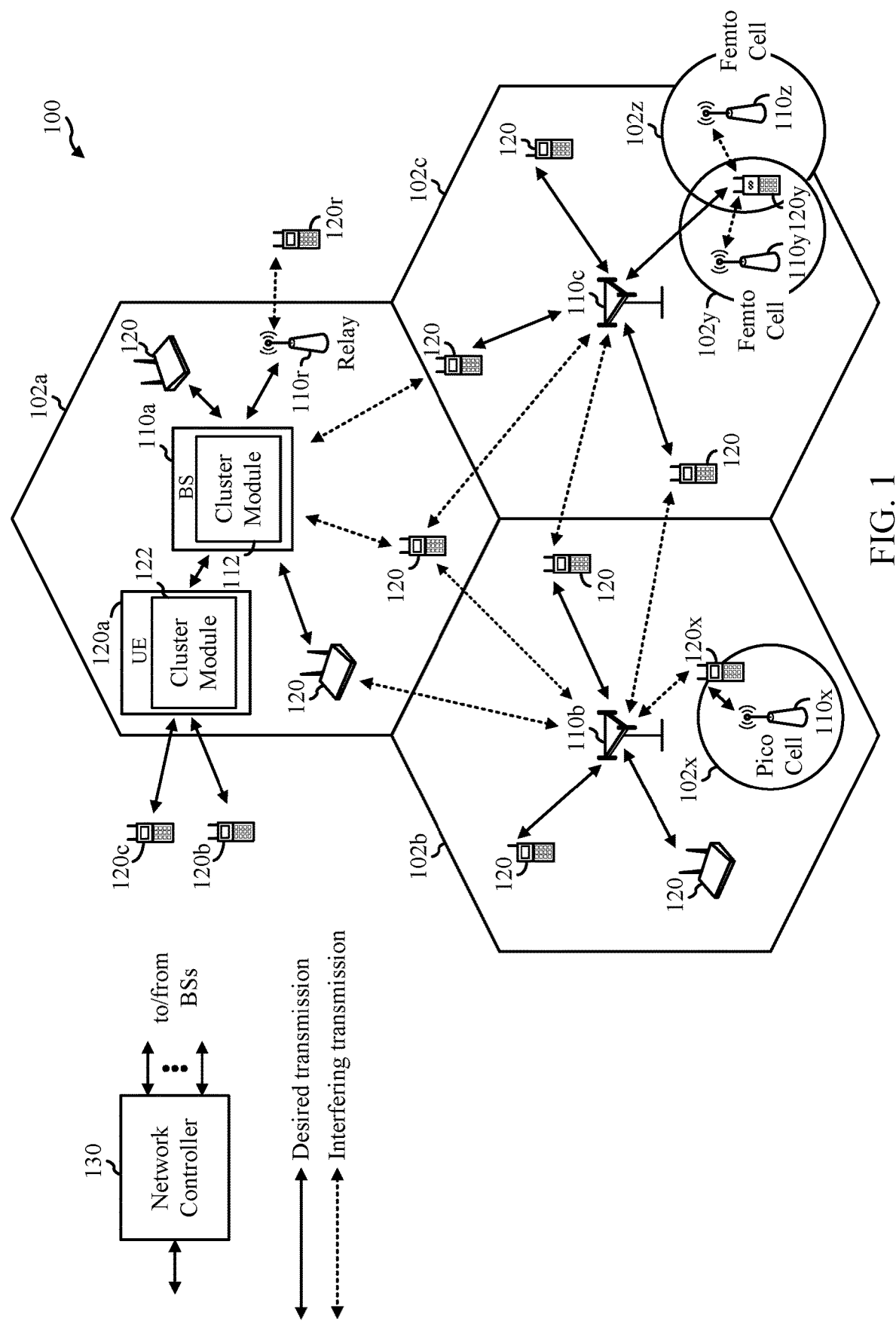
FIG. 1 is a block diagram conceptually illustrating an example telecommunications system, in accordance with certain aspects of the present disclosure.

FIG. 1 illustrates an example wireless communication network 100 in which aspects of the present disclosure may be performed. The wireless communication network 100 may be an NR system (e.g., a 5G NR network). As an example, the BS 110a includes a cluster module 112 configured to form a cluster of wireless nodes (such as UE 120a, UE 120b, and UE 120c) and communicate with the cluster via a relay node (such as UE 120a), in accordance with aspects of the present disclosure. As shown in FIG. 1, the UE 120a includes a cluster module 122 configured to form a cluster and communicate with the base station via the cluster, in accordance with aspects of the present disclosure. For instance, the UE 120a may serve as a relay node in the cluster and forward uplink traffic from UEs 120b and 120c to the BS 110a. The UE 120a may also forward downlink traffic from the BS 110a to the UEs 120b and 120c.

NR is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmWave) targeting a high carrier frequency (e.g., 24 GHz to 52.6 GHz or beyond 52.6 GHz), massive machine type communications MTC (mMTC) targeting non-backward compatible MTC techniques, and/or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Example Assisting Communications of Small Data Payloads with Relay Nodes

In wireless communication networks, certain wireless nodes (e.g., machine-type communication (MTC) devices and/or Internet-of-Things (IoT) devices, which may be narrowband IoT (NB-IoT) devices) may have low data rate demands relative to the system bandwidth or maximum data rate available for wireless communications. As used herein, a low data rate demand may include a data rate that is less than half the system bandwidth. The low data rate payloads (e.g., small data payloads) of MTC/IoT devices (e.g., smart printers, monitors, gaming devices, cameras, watches, etc.) may be occasional measurements, status reports, activity timer configurations, sporadic data, etc. The control overhead in setting up a communication link with a network entity (e.g., BS 110) and scheduling overhead at the network entity for each of the wireless nodes may be excessive relative to the amount of data/traffic generated by the wireless nodes. The low data rate payloads of MTC/IoT devices may also consume a considerable amount of power to transmit the payload to the network entity. For example, the MTC/IoT devices may communicate via mmWave transmissions, which may be considerably more power intensive than lower carrier frequencies (e.g., sub-6 GHz bands).

Certain aspects of the present disclosure relate to communicating with the IoT devices and/or MTC devices via a relay node. In aspects, the power consumption of certain wireless nodes (e.g., mmWave devices) may be improved by transmitting small uplink traffic to a relay node that forwards the uplink traffic to a base station and receiving downlink traffic from the base station via the relay node. In other aspects, the control and scheduling overhead may be reduced by communicating with the relay in a cluster of wireless nodes.

Figure 2:
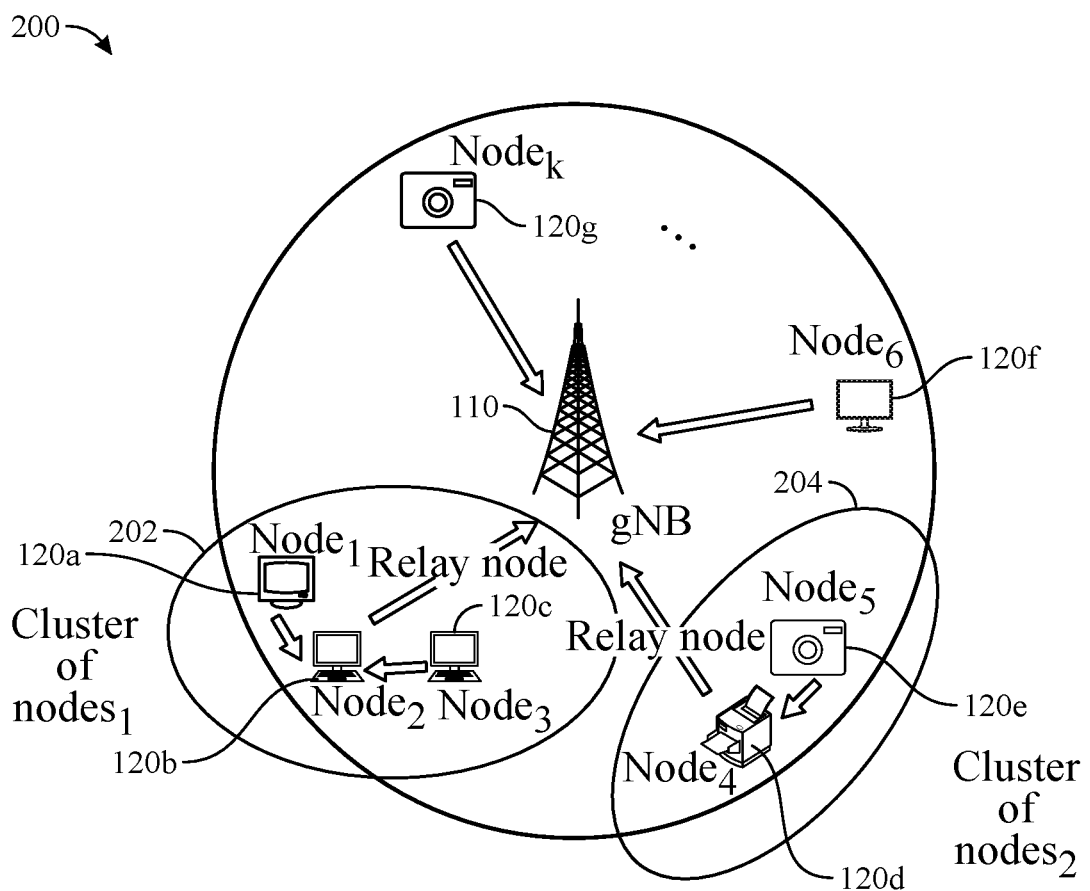
FIG. 2 illustrates an example wireless communication network having various wireless nodes in communication with a network entity via one or more relay nodes, in accordance with certain aspects of the present disclosure.

FIG. 2 illustrates an example wireless communication network 200 having various wireless nodes (e.g., IoT devices and/or MTC devices) in communication with a network entity (e.g., BS 110 of FIG. 1) via one or more relay nodes, in accordance with certain aspects of the present disclosure. As shown, the wireless communication network 200 includes a base station 110 in communication with a first wireless node 120a, a second wireless node 120b, a third wireless node 120c, a fourth wireless node 120d, a fifth wireless node 120e, a sixth wireless node 120f, and a kth wireless node 120g. Each of the wireless nodes 120a-g may be a user equipment as described herein with respect to FIG. 1. The wireless nodes 120a-g and the base station 110 may communicate via 5G-NR air interfaces (e.g., sub-6 GHz frequency bands (FR1) and/or 24 GHz to 52.6 GHz frequency bands (FR2) as well as beyond 52.6 GHz carrier frequencies (FR4)) or legacy air interfaces (e.g., sub-6 GHz frequency bands).

In aspects, wireless nodes that are nearby each other may form a cluster of nodes with a representative wireless node serving as a relay node. For example, a first cluster 202 may include the first wireless node 120a, the second wireless node 120b, and the third wireless node 120c. The base station 110 may communicate with the first cluster 202 via a relay node. For example, the second wireless node 120b may serve as a relay node that forwards traffic to and from child nodes, and the first and third wireless nodes 120a, 120c may serve as child nodes. That is, each of the wireless nodes 120a, 120b, 120c may communicate with the base station 110 via the second wireless node 120b.

In aspects, the relay node may pool data to/from the wireless nodes in the cluster (e.g., the first cluster 202) and communicate with the base station 110. For example, the first and third wireless nodes 120a, 120c may transmit uplink traffic (e.g., packets) to the second wireless node 120b, and the second wireless node 120b may combine the uplink traffic into a larger payload (e.g., concatenate the traffic and error control code the traffic for redundancies) to transmit to the base station 110. In aspects, the relay node (e.g., the second wireless node 120b) may combine its own uplink traffic with the traffic from the child nodes (e.g., the first and third wireless nodes 120a, 120c).

In aspects, the cluster of nodes may be organized based on location information (e.g., global positioning coordinates) available at each wireless node. For instance, the first wireless node may receive location information associated with the second and third wireless nodes 120b, 120c and determine to form a cluster with the second and third wireless nodes 120b, 120c based on the location information. The wireless nodes may form the clusters in coordination with the base station or autonomously.

The IoT devices and/or MTC devices that communicate with the base station via the relay node may reduce control and scheduling overhead for communications with such devices and improve the energy efficiency of such devices.

For instance, in communicating with the first cluster 202, the base station 110 may only transmit control and scheduling signals to the relay node (e.g., the second wireless node 120b) of the first cluster 202. As another example, the first wireless node 120a may use less power to communicate with the second wireless node 120b relative to the power used to communicate with the base station 110.

A second wireless cluster 204 may include the fourth wireless node 120d and the fifth wireless node 120e. The base station 110 may communicate with the second cluster 202 via the fourth wireless node 120d serving as the relay node.

The sixth wireless node 120f and the kth wireless node 120g may communicate with the base station 110 without a relay node. For example, the sixth wireless node 120f may be in close proximity to the base station 110 such that communicating via a relay node does not provide any power savings. As another example, the kth wireless node 120g may not have any wireless nodes in close proximity to form a cluster.

In certain aspects, the wireless nodes 120a-g may communicate at mmWave carrier frequencies (e.g., carrier frequencies of 24 GHz to 52.6 GHz or beyond 52.6 GHz). In an example, the first wireless node 120a may have a small amount of data to send to the base station 110, whereas the second wireless node 120b may have a large amount of data to send to the base station 110. Since energy efficiency is improved with a larger data payload, the first wireless node 120a may convey uplink traffic to the base station 110 via a relay link to the second wireless node 120b, which forwards the uplink traffic of the first wireless node 120a to the base station 110.

In certain cases, upon setting up a mmWave relay link, the second wireless node 120b may convey the size of (an imminent large) uplink payload to the first wireless node 120a. The first wireless node 120a may inform the base station 110 of the relay link with the second wireless node 120b. The first wireless node 120a may transmit uplink traffic (e.g., ciphered for security and privacy reasons) to the second wireless node 120b, which will forward the uplink traffic to the base station 110.

In other cases, if the relay link has not been set up with the second wireless node 120b, the first wireless node 120a may seek assistance from the base station 110 to establish the relay link for data forwarding. The base station 110 may inform the first wireless node 120a of nearby wireless nodes with a large uplink traffic payload and assist the first wireless node 120a with setting up a relay link with one or more of the wireless nodes (such as the second wireless node 120b and/or the third wireless node 120c).

In certain aspects, different wireless nodes in a cluster may serve as the relay node at different times, for example, for enhanced power saving. For example, the wireless nodes may cycle through serving as the relay node on a round robin basis (or using an alternate static or semi-static protocol). The wireless nodes serving as child nodes may reduce power consumption for enhanced power savings. The wireless nodes in a cluster may use a temporal mapping to determine which wireless node serves as the relay node. The temporal mapping may provide which wireless node serves as the relay node and when. For example, the temporal mapping may correspond to a different offset relative to a wake-up schedule period for each of the wireless nodes in a cluster (e.g., T=the first wireless node, 2T=the second wireless node, and 3T=the third wireless node). A relay node configuration indicating the temporal mapping may be dynamic, semi-static, or static over time. A dynamic relay node configuration may determine the current relay node based on various conditions such as operating conditions including power or thermal conditions experienced at the wireless nodes. For instance, changes in power or thermal conditions experienced at a wireless node serving as a relay node may trigger a different wireless node in the cluster taking over as the relay node, permanently or temporarily.

Figure 3A:
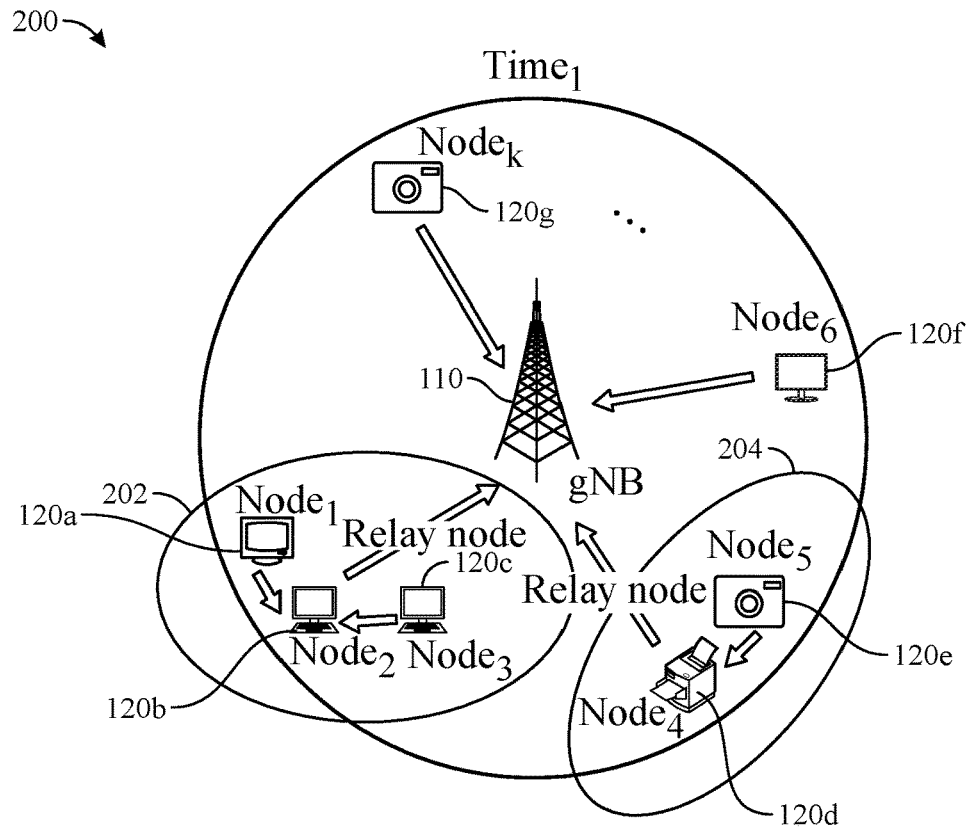
FIG. 3A illustrates wireless nodes serving as relay nodes at a first time period, in accordance with certain aspects.

FIG. 3A illustrates the second wireless node 120b in the first cluster 202 serving as the relay node at a first time period, and the fourth wireless node 120d in the second cluster 204 serving as the relay node at the first time period, in accordance with certain aspects. As shown, the base station 110 may communicate with the first cluster 202 via the second wireless node 120b serving as the relay node at the first time period, and the base station 110 may communicate with the second cluster 204 via the fourth wireless node 120d serving as the relay node at the first time period.

Figure 3B:
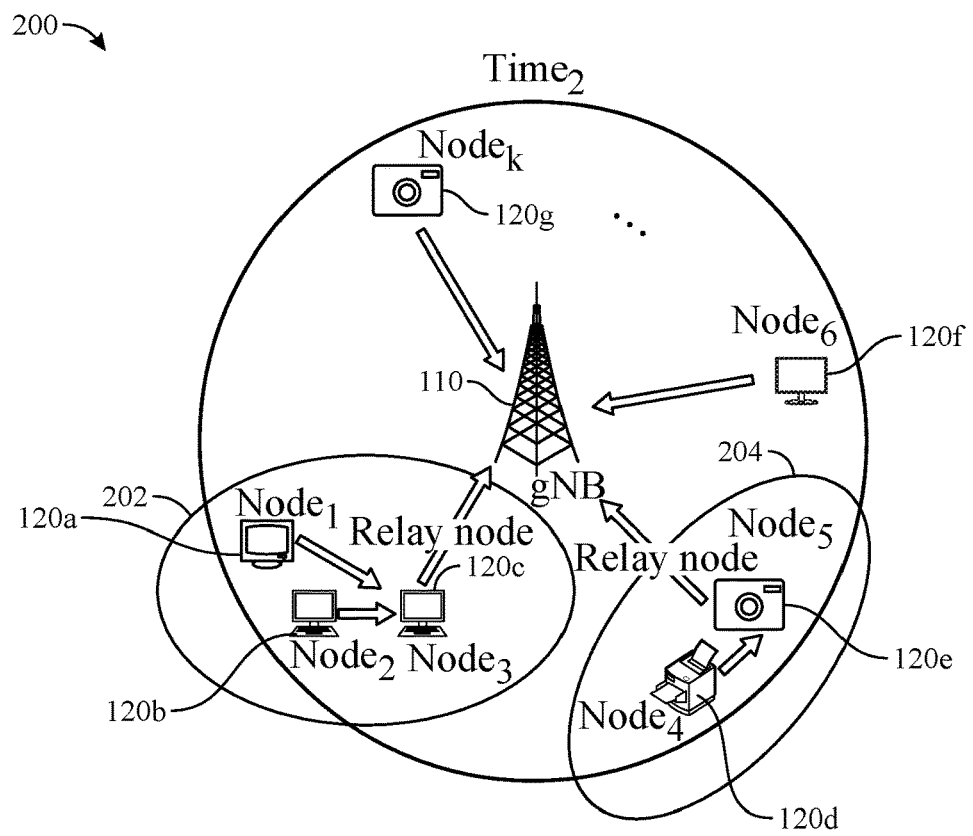
FIG. 3B illustrates wireless nodes serving as relay nodes at a second time period, in accordance with certain aspects.

FIG. 3B illustrates the third wireless node 120c in the first cluster 202 serving as the relay node at a second time period, and the fifth wireless node 120e in the second cluster 204 serving as the relay node at a second time period, in accordance with certain aspects. As shown, the base station 110 may communicate with the first cluster 202 via the third wireless node 120c serving as the relay node at the second time period, and the base station 110 may communicate with the second cluster 204 via the fifth wireless node 120e serving as the relay node at the second time period.

In certain aspects, the IoT devices and/or MTC devices may switch to deep/micro sleep mode of connected mode discontinuous reception (CDRX) periods often to provide enhanced power consumption. The composition of wireless nodes in a cluster may depend on the wake-up schedules (e.g., DRX schedules and/or connected mode DRX (CDRX) schedules) of each of the wireless nodes. The wireless nodes in a cluster may have the same wake-up schedules, and thus, all the wireless nodes may remain in the cluster. In other aspects, the wireless nodes in a cluster may have different wake-up schedules, and at certain periods in time, some wireless nodes may be in a sleep mode and not communicating in the cluster.

In aspects, the wireless nodes may have wake-up schedules at multiples of a wake-period T. As an example, some wireless nodes may wake-up at period T, some wireless nodes may wake-up at period 2T, and other wireless nodes may wake-up at period 3T. The cluster configuration of nodes and relay node role may be dynamic based on wake-up schedules. With the dynamism of wake-up schedules, different wireless nodes may belong to different clusters at different times.

Figure 4A:
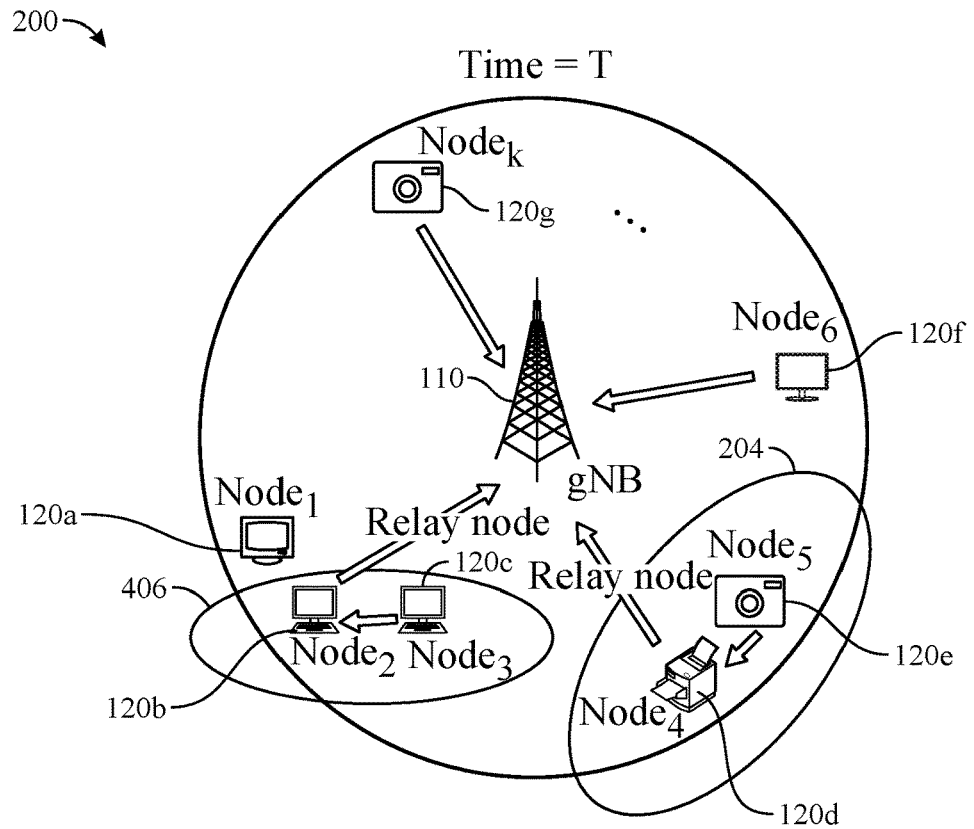
FIG. 4A illustrates clusters communicating with a base station at a first time period, in accordance with certain aspects.

FIG. 4A illustrates a third wireless cluster 406 and second wireless cluster 204 communicating with the base station 110 at a first time period, in accordance with certain aspects. As shown, the base station 110 may communicate with the third cluster 406 including the second and third wireless nodes 120b, 120c via the second wireless node 120b, and the base station 110 may communicate with the second cluster 204 via the fourth wireless node 120d at the first time period. For instance, the third cluster 406 and second cluster 204 may communicate with the base station 110 periodically at the wake-up period T.

Figure 4B:
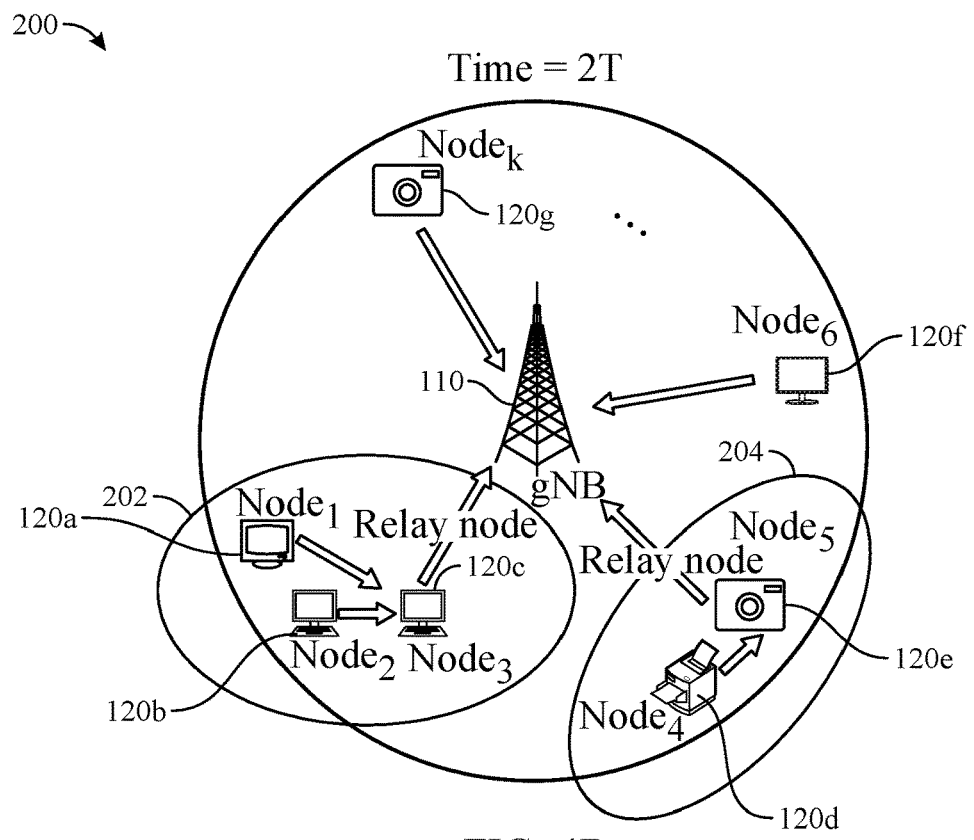
FIG. 4B illustrates different clusters communicating with the base station at a second time period, in accordance with certain aspects.

FIG. 4B illustrates the first wireless cluster 202 and second wireless cluster 204 communicating with the base station 110 at a second time period, in accordance with certain aspects. As shown, the base station 110 may communicate with the first cluster 202 via the third wireless node 120c at a second time period, and the base station 110 may communicate with the second cluster 204 via the fifth wireless node 120e at the second time period. For instance, the first cluster 202 and second cluster 204 may communicate with the base station 110 periodically at a wake-up period 2T.

To accommodate dynamism in relay node mapping, cluster wake-up schedules, and cluster formation, the wireless network may use a distributed protocol or a centralized protocol to configure clusters. Under a distributed protocol, the wireless nodes may autonomously configure clusters. For example, a first wireless node may check with a second wireless node already in a cluster to find out cluster information (e.g., wake-up schedule/timer information and relay duty for the first node to join the cluster, etc.) and join the cluster based on that information. In other aspects, the first wireless node may check with multiple wireless nodes to obtain the cluster information and then determine which cluster to join based on the information.

Under a centralized protocol, a centralized network entity, such as a base station, may configure the clusters. For example, the first wireless node may inform a base station of a desired wake-up period, battery power status, and any other suitable information to join a cluster. The base station may then assign the first wireless node to an existing cluster or a newly formed cluster based on the information.

Figure 5:
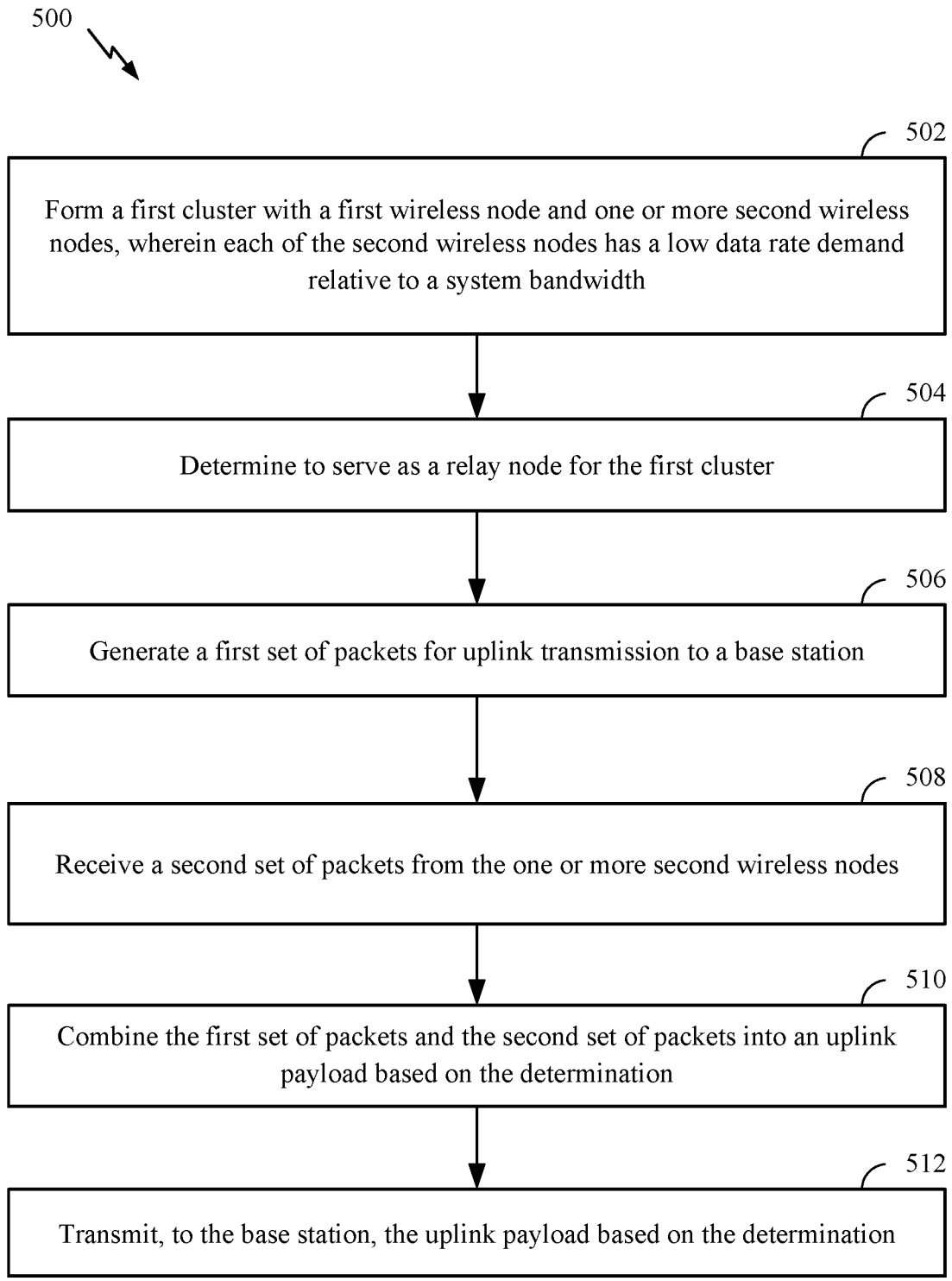
FIG. 5 is a flow diagram illustrating example operations for wireless communication by a relay node, in accordance with certain aspects of the present disclosure.

FIG. 5 is a flow diagram illustrating example operations 500 for wireless communication, in accordance with certain aspects of the present disclosure. The operations 500 may be performed, for example, by a wireless node (e.g., the UE 120a of FIG. 1 or the second wireless node 120b of FIG. 2). The operations 500 may be implemented as software components that are executed and run on one or more processors (e.g., controller/processor 980 of FIG. 9). Further, the transmission and reception of signals by the UE in operations 500 may be enabled, for example, by one or more antennas (e.g., antennas 952 of FIG. 9). In certain aspects, the transmission and/or reception of signals by the UE may be implemented via a bus interface of one or more processors (e.g., controller/processor 980) obtaining and/or outputting signals. In aspects, a wireless node may refer to a wireless communication device, such as a use equipment.

The operations 500 may begin, at 502, where a first wireless node (e.g., the second wireless node 120b of FIG. 2) may form a first cluster with the first wireless node and one or more second wireless nodes (e.g., the first and third wireless nodes 120a, 120c of FIG. 2), wherein each of the second wireless nodes has a low data rate demand relative to a system bandwidth. At 504, the first wireless node may determine to serve as a relay node for the first cluster. At 506, the first wireless node may generate a first set of packets for uplink transmission to a base station. At 508, the first wireless node may receive a second set of packets from the one or more second wireless nodes. At 510, the first wireless node may combine the first set of packets and the second set of packets into an uplink payload. At 512, the first wireless node may transmit, to the base station, the uplink payload.

In aspects, the formation of a cluster (e.g., the first cluster) may be coordinated by the base station. That is, the formation of a cluster may use a centralized protocol via a network entity such as the base station. As an example, the wireless nodes may provide a base station with node information related to forming a cluster including location information of the wireless nodes, wake-up schedules of the wireless nodes, relay node schedules of the wireless nodes, operating conditions (e.g., power consumption level, battery level, operating temperature, processing load, etc.) of the wireless nodes, or the like. The base station may determine the composition of the wireless nodes in a cluster based on the node information and transmit instructions to the wireless nodes to form the cluster. In certain cases, the base station may identify several MTC/IoT devices with low data rate demands in close proximity to each other and instruct these devices to form a cluster. As an example, the first wireless node of operations 500 may receive instructions, from the base station, to form the first cluster with the one or more second wireless nodes.

As another example, the first wireless node may transmit, to the base station, a request to join a cluster, the request indicating node information including at least one of location information of the first wireless node, a wake-up schedule of the first wireless node, or a battery status of the first wireless node. After the base station determines which cluster to assign the first wireless node based on the node information, the first wireless node may receive instructions from the base station to join the first cluster, for example. In certain cases, the first wireless node may determine that it has low data rate demands and may benefit from forming or joining a cluster. Based on this determination, the first wireless node may transmit the request to join or form a cluster to the base station.

In other aspects, the formation of a cluster (e.g., the first cluster) may be formed via autonomous coordination among the wireless nodes (e.g., the first wireless node and the one or more second wireless nodes). In certain cases, the wireless nodes may use a distributed protocol to form the clusters. For example, the first wireless node may receive, from one or more clusters including the first cluster, cluster information including at least one of location information of wireless nodes in the clusters, wake-up schedules of the wireless nodes, or relay node schedules of the wireless nodes. The first wireless node may determine to join the first cluster based on the cluster information. As an example, the relay nodes in the clusters may periodically broadcast the cluster information to enable other wireless nodes, such as the first wireless node of the operations 500, to join the cluster. In certain cases, the first wireless node may determine that it has low data rate demands and benefit from forming or joining a cluster. Based on this determination, the first wireless node may monitor the broadcasted cluster information from nearby wireless nodes that have formed a cluster and determine whether to join the cluster as described herein. In other cases, the first wireless node may transmit a request to other wireless nodes to form or join a cluster. As another example, the first wireless node may receive a request to form or join a cluster from other wireless nodes.

The wireless nodes may exchange the node information related to forming a cluster, or the wireless nodes may receive the node information related to forming the cluster from the base station. While serving as a master node or relay node, a wireless node may determine the composition of the wireless nodes in the cluster based on the information and transmit instructions to the wireless nodes to form the cluster. As an example, the first wireless node of operations 500 may determine, based on the node information, that the one or more second wireless nodes and the first wireless node may form the first cluster and transmit instructions to the second one or more wireless nodes to form the first cluster. As another example, one of the second wireless nodes may determine, based on the node information, that the first wireless node and the second wireless nodes may form the first cluster, and the first wireless node may receive, from one of the second wireless nodes, instructions to form the first cluster.

The formation of a cluster (e.g., the first cluster of the operations 500) at 502 may include the first wireless node joining the first cluster. For example, the first wireless node may join the first cluster based on information related to joining the cluster including at least one of location information of wireless nodes in a network (e.g., the wireless nodes 120*a-g*), wake-up schedules of the wireless nodes, relay node schedules of the wireless nodes, or operating conditions of the wireless nodes. The first wireless node may receive the information from base station or other wireless nodes (such as the one or more second wireless nodes) and determine to join the cluster based on the information. For example, the first wireless node may determine that it is nearby or in close proximity to wireless nodes (e.g., the first and third wireless nodes 120*a*, 120*c* of FIG. 2) and join the cluster. As another example, the first wireless node may determine that it is operating at a different wake-up schedule relative to the cluster and join the cluster at multiples of a wake-up schedule period, for example, as described herein with respect to FIGS. 4A and 4B.

In aspects, different wireless nodes in a cluster may serve as the relay node at different times (e.g., wake-up times associated with a CDRX schedule) as described herein with respect to FIGS. 3A and 3B. As an example, the first wireless node may default to serving as the relay node based on being the wireless node to initiate the formation of the cluster. In aspects, the first wireless node may receive instructions to serve as the relay node from the base station, and at 504, the first wireless node may determine to serve as the relay node based on the instructions from the base station. In other aspects, the first wireless node may receive instructions to serve as the relay node from another wireless node in the cluster, and at 504, the first wireless node may determine to serve as the relay node based on the instructions from the other wireless node.

At 504, the first wireless node may determine to serve as the relay node based on a temporal mapping indicating which wireless nodes serve as the relay node at various time periods. The temporal mapping may be received from the base station and/or one of the second wireless nodes in the first cluster, such as a current relay node. As an example, the first wireless node may determine that the first wireless node serves as a relay node in the first cluster for a first time period and that a third wireless node from the second wireless nodes serves as the relay node for a second time period. The first wireless node may generate a third set of packets for uplink transmission. After the first time period and before the second time period, the first wireless node may transmit the third packets to the third wireless node, which is serving as the relay node in the first cluster.

The first wireless node may determine the first time period and the second time period based on a temporal mapping indicating the relay node in the first cluster for a plurality of time periods. In certain cases, the first wireless node may receive, from the base station, a relay node configuration indicating the temporal mapping.

In other cases, the temporal mapping may be coordinated with the other wireless nodes. For example, the relay node of a cluster may receive, from the wireless nodes, the operating conditions (e.g., power consumption level, battery level, operating temperature, processing load, etc.) of the wireless nodes in the cluster and determine the temporal mapping based on the operating conditions. The relay node may generate a relay node configuration indicating the temporal mapping and transmit the relay node configuration to the other wireless nodes in the cluster. The relay node configuration may be dynamic, semi-static, or static over time. The relay node configuration may be based on one or more operating conditions encountered by at least one of the first wireless node or the one or more second wireless nodes. The one or more operating conditions may include at least one of a power consumption level, a battery level, an operating temperature, or a processing load of the wireless node.

In aspects, the relay node configuration and temporal mapping may be based on wake-up schedules of the wireless nodes such as at least one of the first wireless node or the one or more second wireless nodes. For example, suppose the first wireless node wakes up at every T wake-up periods, whereas some of the second wireless nodes wake-up every 2T wake-up periods. The first wireless node may serve as the relay node between the 2T wake-up periods, and one of the second wireless nodes may serve as the relay node during the 2T wake-up periods.

In certain aspects, the composition of wireless nodes in a cluster may depend on the wake-up schedules (e.g., DRX schedules and/or CDRX schedules) of each of the wireless nodes, as described herein with respect to FIGS. 4A and 4B. For example, the first wireless node and the one or more second wireless nodes may have the same wake-up schedule. As another example, the first wireless node and the one or more second wireless nodes may have different wake-up schedules comprising a wake-up period at multiples of an indicated period. In certain cases, a wireless node may belong to multiple clusters. For example, the first wireless node may communicate with the first cluster during a first portion of a wake-up schedule and communicate with a second cluster during a second portion of the wake-up schedule.

At 510, the first wireless node may combine the first set of packets and the second set of packets into the uplink payload, for example, by concatenating, segmenting, and/or reassembling the packets into the uplink traffic payload. The size of the uplink traffic payload may be greater than the size of the second set of packets. The first wireless node may also perform error correction (e.g., through automatic repeat request (ARQ) operations) and/or integrity protection on the uplink traffic payload.

As a relay node, the wireless node may forward downlink traffic to child nodes. For example, the first wireless node may receiving a fourth set of packets from the base station and determine a destination for the fourth set of packets among the one or more second wireless nodes. The first wireless node may transmit the fourth set of packets to the one or more second wireless nodes in accordance with the determination of the destination.

In certain aspects, the first set of packets may have a larger payload than the second set of packets, and the first wireless node, the one or more second set of wireless nodes, and the base station may communicate via a mmWave wireless communication network corresponding to carrier frequencies of 24 GHz to 52.6 GHz or beyond 52.6 GHz. Upon establishing a relay link in the first cluster, the first wireless node may exchange payload sizes of uplink transmissions with the second one or more wireless nodes to determine which wireless node has a larger payload to serve as the relay node. The first wireless node may determine that the first set of packets has a larger payload size, and thus, the first wireless node will serve as the relay node for the one or more second wireless nodes.

In aspects, the first wireless node and the one or more second wireless nodes may be low-complexity IoT wireless devices. The first wireless node, the one or more second set of wireless nodes, and the base station may communicate via a 5G-NR air interface or a legacy air interface (e.g., LTE air interface). For example, the first wireless node may receive the second set of packets via the 5G-NR air interface or the legacy air interface.

Figure 6:
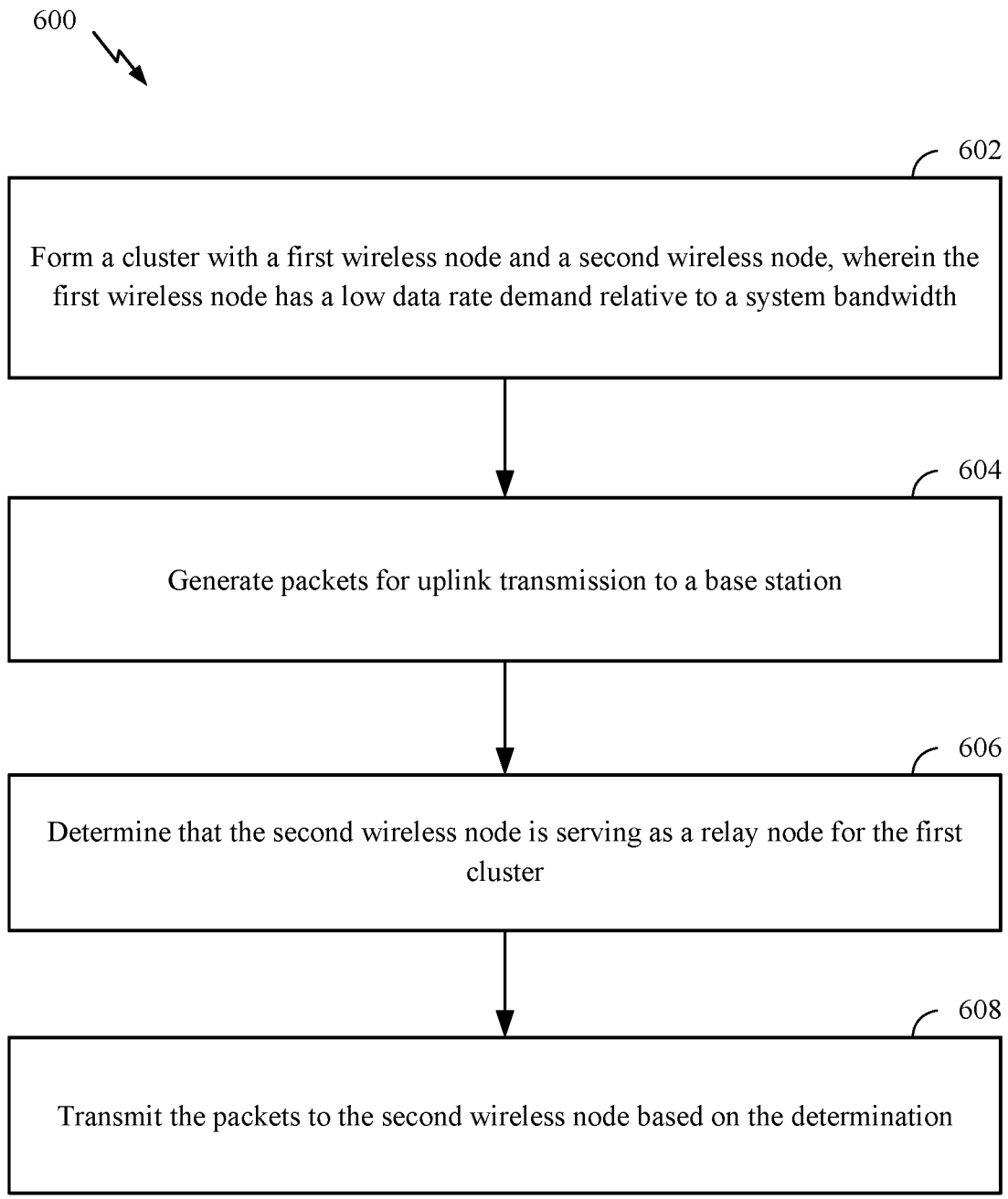
FIG. 6 is a flow diagram illustrating example operations for wireless communication by a child node, in accordance with certain aspects of the present disclosure.

FIG. 6 is a flow diagram illustrating example operations 600 for wireless communication, in accordance with certain aspects of the present disclosure. The operations 600 may be performed, for example, by a wireless node (e.g., the UE 120b of FIG. 1 or the first wireless node 120a of FIG. 2). The operations 600 may be performed by a child node and complimentary to the operations 500 performed by a relay node (e.g., the second wireless node 120b of FIG. 2). The operations 600 may be implemented as software components that are executed and run on one or more processors (e.g., controller/processor 980 of FIG. 9). Further, the transmission and reception of signals by the UE in the operations 600 may be enabled, for example, by one or more antennas (e.g., antennas 952 of FIG. 9). In certain aspects, the transmission and/or reception of signals by the UE may be implemented via a bus interface of one or more processors (e.g., controller/processor 980) obtaining and/or outputting signals.

The operations 600 may begin, at 602, where a first wireless node (e.g., the first wireless node 120a of FIG. 2) may form a cluster with a second wireless node (e.g., the second wireless node 120b of FIG. 2) and the first wireless node, wherein the first wireless node has a low data rate demand relative to a system bandwidth. At 604, the first wireless node may generate packets for uplink transmission to a base station (e.g., the base station 110). At 606, the first wireless node may determine that the second wireless node is serving as a relay node for the first cluster. At 608, the first wireless node may transmit the packets to the second wireless node based on the determination.

In certain aspects, the first wireless node may receive, from the second wireless node or the base station, an uplink transmission payload size that is associated with the second wireless node. The uplink transmission payload size may be greater than a size of the packets generated at 604. The first wireless node may determine, based on the uplink transmission payload size, to forward the packets to the base station through a relay link in the cluster via the second wireless node. In certain cases, the first wireless node may transmit to the base station an indication of the relay link via the second wireless node. In other cases, the first wireless node may transmit, to the base station, a relay forwarding request to establish a relay link with the second wireless node. The first wireless node may then receive instructions from the base station to establish the relay link and communicate with the base station through the relay link via the second wireless node.

The first wireless node and the second wireless nodes may be low-complexity IoT wireless devices. The first wireless node, the second wireless node, and the base station may communicate via a mmWave wireless communication network corresponding to carrier frequencies of 24 GHz to 52.6 GHz or beyond 52.6 GHz.

Figure 7:
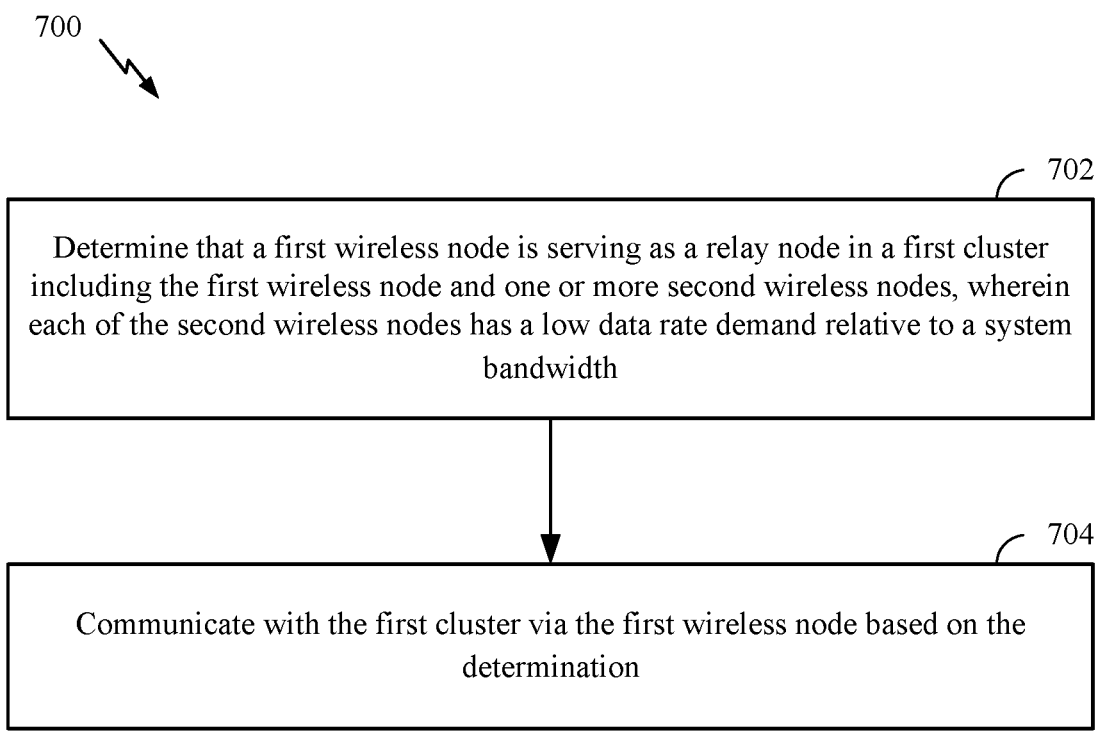
FIG. 7 is a flow diagram illustrating example operations for wireless communication by a network entity, in accordance with certain aspects of the present disclosure.

FIG. 7 is a flow diagram illustrating example operations 700 for wireless communication, in accordance with certain aspects of the present disclosure. The operations 700 may be performed, for example, by a network entity (e.g., the base station 110a FIG. 1 or the base station 110 of FIGS. 2, 3A, 3B, 4A, and 4B). The operations 700 may be complimentary to the operations 500 and/or 600 performed by a wireless node (e.g., the second wireless node 120b of FIG. 2). The operations 700 may be implemented as software components that are executed and run on one or more processors (e.g., controller/processor 940 of FIG. 9). Further, the transmission and reception of signals by the network entity in the operations 700 may be enabled, for example, by one or more antennas (e.g., antennas 934 of FIG. 9). In certain aspects, the transmission and/or reception of signals by the network entity may be implemented via a bus interface of one or more processors (e.g., controller/processor 940) obtaining and/or outputting signals.

The operations 700 may begin, at 702, where the base station may determine that a first wireless node (e.g., the second wireless node 120b of FIG. 2) is serving as a relay node in a first cluster including the first wireless node and one or more second wireless nodes (e.g., the first and third wireless nodes 120a, 120c of FIG. 2), wherein each of the second wireless nodes has a low data rate demand relative to a system bandwidth. At 704, the base station may communicate with the first cluster via the first wireless node.

In certain aspects, the base station may coordinate the formation of the first cluster with the first wireless node and the one or more second wireless nodes. For example, the base station may receive, from wireless nodes, a request to form a cluster indicating node information related to forming a cluster including location information of the wireless nodes, wake-up schedules of the wireless nodes, relay node schedules of the wireless nodes, operating conditions (e.g., power consumption level, battery level, operating temperature, processing load, etc.) of the wireless nodes, or the like. The base station may determine the composition of the wireless nodes in a cluster based on the information and transmit instructions to the wireless nodes to form the cluster. As an example, the base station may receive, from the first wireless node, a request to form a cluster, the request indicating node information including at least one of location information of the first wireless node, a wake-up schedule of the first wireless node, or a battery status of the first wireless node. The base station may determine that the first wireless node is to form the first cluster with the second wireless nodes based at least in part on the node information and transmit, to the first wireless node, instructions to form the first cluster.

In other aspects, the formation of a cluster may be formed via autonomous coordination among the wireless nodes with assistance from the base station. For example, the base station may receive the node information from the wireless nodes and forward the node information to other wireless nodes to allow the wireless nodes to determine the node composition of the cluster. As an example, the base station may receive, from the one or more second wireless nodes, at least one of location information, wake-up schedules, or relay node schedules of the one or more second wireless nodes, and the base station may transmit, to the first wireless node, at least one of the location information, the wake-up schedules, or the relay node schedules of the one or more second wireless nodes. The first wireless node may then use the information to determine whether to form or join the first cluster with the second wireless nodes.

In aspects, different wireless nodes in a cluster may serve as the relay node at different times (e.g., wake-up times associated with a CDRX schedule) as described herein with respect to FIGS. 3A and 3B. For example, the base station may determine that the first wireless node serves as the relay node in the first cluster for a first time period and that a third wireless node from the second wireless nodes serves as the relay node for a second time period. After the first time period and during the second time period, the base station may communicate with the first cluster via the third wireless node.

In certain cases, the base station may determine the first time period and the second time period based on a temporal mapping indicating the relay node in the first cluster for a plurality of time periods. The base station may generate a relay node configuration indicating the temporal mapping and transmit, to the first wireless node, the relay node configuration.

In aspects, the base station may generate the temporal mapping based on operating conditions (e.g., power consumption level, battery level, operating temperature, processing load, etc.) of the wireless nodes in the cluster. For example, the base station may receive one or more operating conditions encountered by at least one of the first wireless node or the one or more second wireless nodes, and the base station may generate the relay node configuration based on one or more operating conditions of the wireless nodes. The one or more operating conditions may include at least one of a power consumption level, a battery level, an operating temperature, or a processing load.

In other aspects, the temporal mapping may be based on the wake-up schedules of the wireless nodes. For example, the base station may generate the relay node configuration based on wake-up schedules of at least one of the first wireless node or the one or more second wireless nodes. As an example, suppose the first wireless node wakes up at every T wake-up periods, whereas some of the second wireless nodes wake-up every 2T wake-up periods. The first wireless node may serve as the relay node between the 2T wake-up periods, and one of the second wireless nodes may serve as the relay node during the 2T wake-up periods.

The composition of wireless nodes in a cluster may depend on the wake-up schedules (e.g., DRX schedules and/or CDRX schedules) of each of the wireless nodes, as described herein with respect to FIGS. 4A and 4B. In certain cases, the first wireless node and the one or more second wireless nodes may have the same wake-up schedule. In other cases, the first wireless node and the one or more second wireless nodes may have different wake-up schedules comprising a wake-up period at multiples of an indicated period. In aspects, the base station may communicate with different clusters at different multiples of an indicated period. For example, the base station may communicate with a second cluster, including the first wireless node, during a first portion of a wake-up schedule and communicate with the first cluster during a second portion of a wake-up schedule.

At 704, the base station may communicate with the first cluster via downlink or uplink communications. For example, the base station may transmit packets to the first wireless node, where at least one of the packets has the one or more second wireless node as a destination. As another example, the base station may receive, from the first wireless node, an uplink payload comprising a first set of packets from the first wireless node and a second set of packets from the one or more second wireless nodes.

The base station may receive, from the one or more second wireless nodes, an indication of a data forwarding via the relay node. In aspects, a first set of packets received from the first wireless node may have a larger payload than a second set of packets received from the second wireless nodes, and the first wireless node, the one or more second wireless nodes, and the base station may communicate via a mmWave wireless communication network corresponding to carrier frequencies of 24 GHz to 52.6 GHz or beyond 52.6 GHz.

The first wireless node and the one or more second wireless nodes are low-complexity IoT wireless devices.

The first wireless node, the one or more second set of wireless nodes, and the base station may communicate via a 5G-NR air interface or a legacy air interface (e.g., a LTE air interface). For example, the base station may communicate with the first cluster via a 5G-NR air interface or a legacy air interface.

Figure 8:
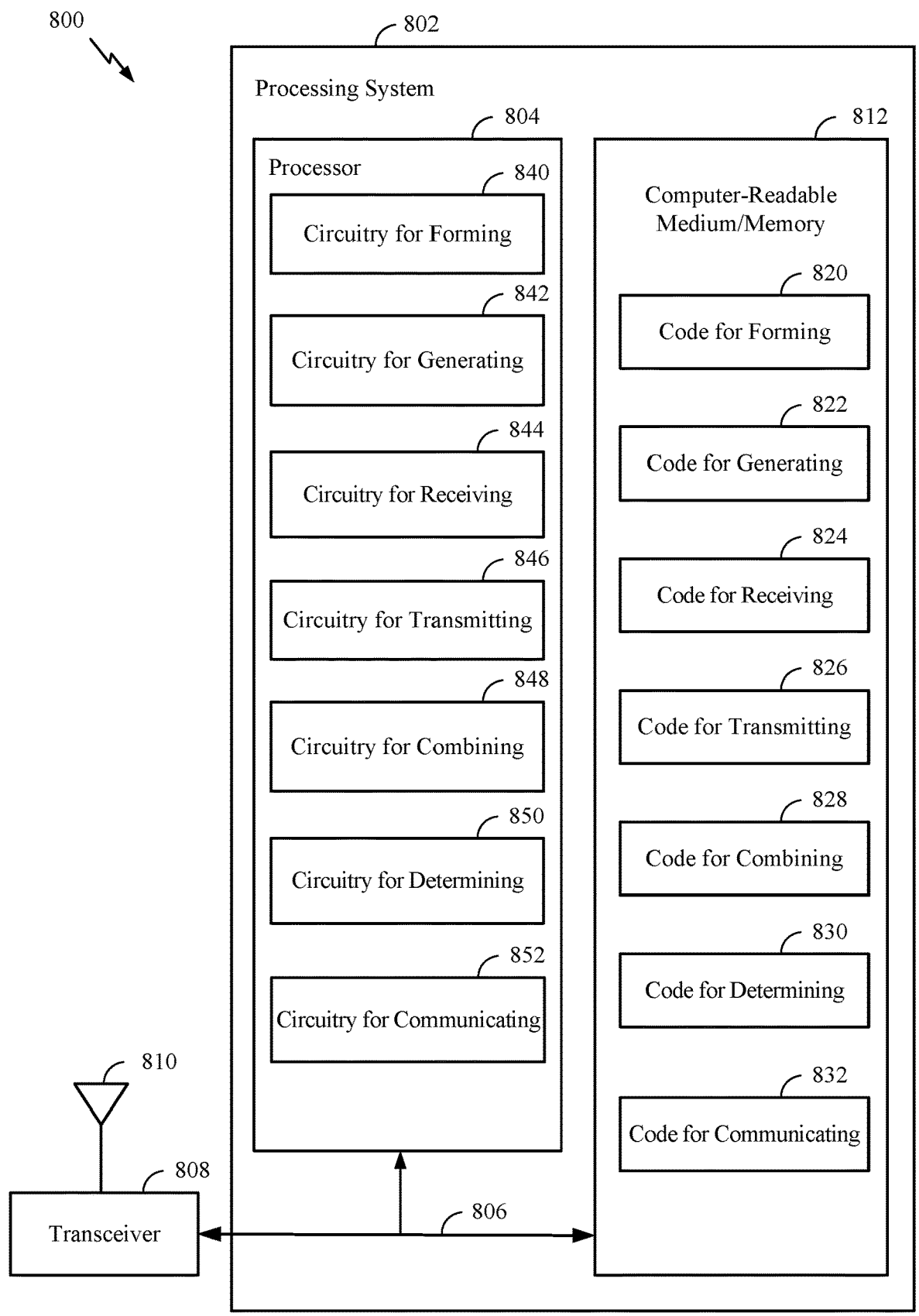
FIG. 8 illustrates a communications device that may include various components configured to perform operations for the techniques disclosed herein in accordance with aspects of the present disclosure.

FIG. 8 illustrates a communications device 800 (e.g., a wireless node, a user equipment, a base station, a relay node, and/or a child node) that may include various components (e.g., corresponding to means-plus-function components) configured to perform operations for the techniques disclosed herein, such as the operations illustrated in FIGS. 5-7. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIGS. 5-7, or other operations for performing the various techniques discussed herein for relay node communications. In certain aspects, computer-readable medium/memory 812 may store code for forming 820, code for generating 822, code for receiving 824, code for transmitting 826, code for combining 828, code for determining 830, and/or code for communicating 832. In certain aspects, the processor 804 has circuitry configured to implement the code stored in the computer-readable medium/memory 812. The processor 804 may include circuitry for forming 840, circuitry for generating 842, circuitry for receiving 844, circuitry for transmitting 846, circuitry for combining 848, circuitry for determining 850, and/or circuitry for communicating 852.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Figure 9:
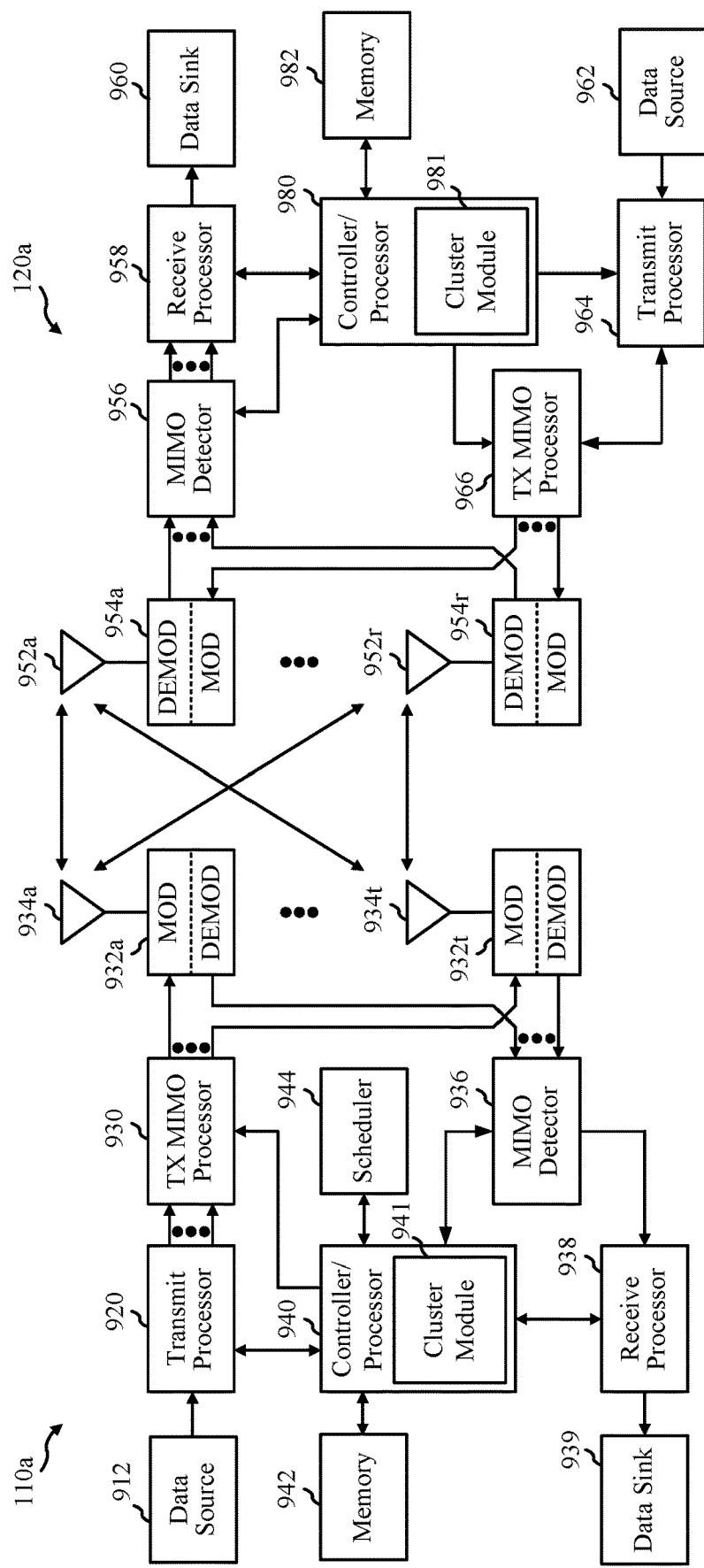
FIG. 9 is a block diagram conceptually illustrating a design of an example BS and UE, in accordance with certain aspects of the present disclosure.

FIG. 9 illustrates example components of BS 110a and UE 120a (e.g., in the wireless communication network 100 of FIG. 1), which may be used to implement aspects of the present disclosure.

At the BS 110a, a transmit processor 920 may receive data from a data source 912 and control information from a controller/processor 940. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the PDSCH, etc. The processor 920 may process (e.g., encode and symbol map) the data and control information to obtain data symbols and control symbols, respectively. The transmit processor 920 may also generate reference symbols, such as for the primary synchronization signal (PSS), secondary synchronization signal (SSS), and cell-specific reference signal (CRS). A transmit (TX) multiple-input multiple-output (MIMO) processor 930 may perform spatial processing (e.g., precoding) on the data symbols, the control symbols, and/or the reference symbols, if applicable, and may provide output symbol streams to the modulators (MODs) 932a-932t. Each modulator 932 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 932a-932t may be transmitted via the antennas 934a-934t, respectively.

At the UE 120a, the antennas 952a-952r may receive the downlink signals from the BS 110a and may provide received signals to the demodulators (DEMODs) in transceivers 954a-954r, respectively. Each demodulator 954 may condition (e.g., filter, amplify, downconvert, and digitize) a respective received signal to obtain input samples. Each demodulator may further process the input samples (e.g., for OFDM, etc.) to obtain received symbols. A MIMO detector 956 may obtain received symbols from all the demodulators 954a-954r, perform MIMO detection on the received symbols if applicable, and provide detected symbols. A receive processor 958 may process (e.g., demodulate, deinterleave, and decode) the detected symbols, provide decoded data for the UE 120a to a data sink 960, and provide decoded control information to a controller/processor 980.

On the uplink, at UE 120a, a transmit processor 964 may receive and process data (e.g., for the physical uplink shared channel (PUSCH)) from a data source 962 and control information (e.g., for the physical uplink control channel (PUCCH) from the controller/processor 980. The transmit processor 964 may also generate reference symbols for a reference signal (e.g., for the sounding reference signal (SRS)). The symbols from the transmit processor 964 may be precoded by a TX MIMO processor 966 if applicable, further processed by the demodulators in transceivers 954a-954r (e.g., for SC-FDM, etc.), and transmitted to the BS 110a. At the BS 110a, the uplink signals from the UE 120a may be received by the antennas 934, processed by the modulators 932, detected by a MIMO detector 936 if applicable, and further processed by a receive processor 938 to obtain decoded data and control information sent by the UE 120a. The receive processor 938 may provide the decoded data to a data sink 939 and the decoded control information to the controller/processor 940.

The memories 942 and 982 may store data and program codes for BS 110a and UE 120a, respectively. A scheduler 944 may schedule UEs for data transmission on the downlink and/or uplink.

The controller/processor 980 and/or other processors and modules at the UE 120a may perform or direct the execution of processes for the techniques described herein. For example, the controller/processor 940 of the BS 110a has a cluster module 941 that may be configured for forming a cluster and communicating with the cluster, according to aspects described herein. The controller/processor 980 of the UE 120a has a cluster module 981 that may be configured for forming a cluster and communicating with a base station via the cluster, according to aspects described herein. Although shown at the Controller/Processor, other components of the UE 120a and BS 110a may be used performing the operations described herein.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication, comprising:
a processing system configured to:
form a cluster with the apparatus and one or more first wireless nodes, wherein each of the one or more first wireless nodes has a low data rate demand relative to a system bandwidth,
determine to serve as a relay node for the cluster, wherein one of the one or more first wireless nodes serves as the relay node for the cluster after the apparatus serves as the relay node for the cluster based on one or more operating conditions associated with at least one of the apparatus or the one or more first wireless nodes, and wherein the one or more operating conditions comprise at least one of a power consumption level, a battery level, or an operating temperature, and
generate a first set of packets for uplink transmission to a base station; and
a transceiver configured to receive a second set of packets from the one or more first wireless nodes,
wherein the processing system is configured to combine the generated first set of packets and the received second set of packets into an uplink payload based on the determination, and
wherein the transceiver is configured to transmit, to the base station, the uplink payload based on the determination.

2. The apparatus of claim 1, wherein the processing system is configured to coordinate the formation of the cluster with the base station or form the cluster via autonomous coordination among the apparatus and the one or more first wireless nodes.

3. The apparatus of claim 1, wherein:
the transceiver is configured to receive at least one of location information of wireless nodes in a network, wake-up schedules of the wireless nodes in the network, or relay node schedules of the wireless nodes in the network from the base station or the one or more first wireless nodes; and
the processing system is configured to join the cluster based on at least one of the location information, the wake-up schedules, or the relay node schedules.

4. The apparatus of claim 1, wherein:
the transceiver is configured to receive, from one or more clusters including the cluster, cluster information including at least one of location information of wireless nodes in the clusters, wake-up schedules of the wireless nodes in the clusters, or relay node schedules of the wireless nodes in the clusters; and the processing system is configured to determine to join the cluster based on the cluster information.

5. The apparatus of claim 1, wherein the transceiver is configured to:
transmit, to the base station, a request to join a cluster, the request indicating node information including at least one of location information of the apparatus, a wake-up schedule of the apparatus, or a battery status of the apparatus; and
receive instructions from the base station to join the cluster.

6. The apparatus of claim 1, wherein:
the processing system is configured to:
determine that the apparatus serves as the relay node in the cluster for a first time period and that a second wireless node from the one or more first wireless nodes serves as the relay node for a second time period, and
generate a third set of packets for uplink transmission; and
the transceiver is configured to transmit, after the first time period and before or within the second time period, the third set of packets to the second wireless node.

7. The apparatus of claim 6, wherein:
the processing system is configured to determine the first time period and the second time period based on a temporal mapping indicating the relay node in the cluster for a plurality of time periods, the temporal mapping is based on a relay node configuration indicated from the base station or coordinated with the one or more first wireless nodes.

8. The apparatus of claim 7, wherein:
the relay node configuration is dynamic, semi-static, or static over time;
or
the relay node configuration is based on wake-up schedules of at least one of apparatus or the one or more first wireless nodes.

9. The apparatus of claim 1, wherein the apparatus and the one or more first wireless nodes have a same wake-up schedule or different wake-up schedules comprising a wake-up period at multiples of an indicated period.

10. The apparatus of claim 1, wherein:
the transceiver is configured to receive a third set of packets from the base station;
the processing system is configured to determine a destination for the third set of packets among the one or more first wireless nodes; and
the transceiver is configured to transmit the third set of packets to the one or more first wireless nodes in accordance with the determination of the destination.

11. The apparatus of claim 1, wherein:
the processing system is configured to exchange, upon establishing a relay link in the cluster, payload sizes of uplink transmissions with the first one or more wireless nodes;
the generated first set of packets have a larger payload than the received second set of packets; and
the apparatus, the one or more first wireless nodes, and the base station communicate via a millimeter wave (mmWave) wireless communication network corresponding to carrier frequencies of 24 GHz to 52.6 GHz or beyond 52.6 GHz.

12. The apparatus of claim 1, wherein the apparatus and the one or more first wireless nodes are low-complexity Internet-of-Things (IoT) wireless devices.

13. An apparatus for wireless communication, comprising:
a processing system configured to:
form a cluster with one or more wireless nodes and the apparatus, wherein the apparatus has a low data rate demand relative to a system bandwidth,
generate packets for uplink transmission to a base station, and
determine that a wireless node within the one or more wireless nodes is serving as a relay node for the cluster; and
a transceiver configured to:
receive, from the wireless node, an uplink transmission payload size that is associated with the wireless node and greater than a size of all the generated packets;
transmit the generated packets to the base station through a relay link in the cluster via the wireless node based on the determination and the uplink transmission payload size.

14. The apparatus of claim 13, wherein the transceiver is configured to transmit to the base station an indication of the relay link via the wireless node.

15. The apparatus of claim 13, wherein the transceiver is configured to:
transmit, to the base station, a relay forwarding request to establish a relay link with the wireless node;
receive instructions from the base station to establish the relay link; and
communicate with the base station through the relay link via the wireless node.

16. The apparatus of claim 13, wherein the apparatus and the wireless nodes are low-complexity Internet-of-Things (IoT) wireless devices.

17. The apparatus of claim 13, wherein the apparatus, the wireless node, and the base station communicate via a millimeter wave (mmWave) wireless communication network corresponding to carrier frequencies of 24 GHz to 52.6 GHz or beyond 52.6 GHz.

18. An apparatus for wireless communication, comprising:
a processing system configured to determine that:
a first wireless node is serving as a relay node in a cluster including the first wireless node and one or more second wireless nodes, wherein each of the one or more second wireless nodes has a low data rate demand relative to a system bandwidth; and
the first wireless node serves as the relay node in the cluster for a first time period and a third wireless node from the one or more second wireless nodes serves as the relay node for a second time period; and
a transceiver configured to communicate with the cluster:
via the first wireless node during the first time period based on the determination; and
via the third wireless node after the first time period and during the second time period.

19. The apparatus of claim 18, wherein the processing system is configured to coordinating a formation of the cluster with the first wireless node and the one or more second wireless nodes.

20. The apparatus of claim 18, wherein the transceiver is configured to:
receive, from the one or more second wireless nodes, at least one of location information, wake-up schedules, or relay node schedules of the one or more second wireless nodes; and transmit, to the first wireless node, at least one of the location information, the wake-up schedules, or the relay node schedules of the one or more second wireless nodes.

21. The apparatus of claim 18, wherein:
the transceiver is configured to receive, from the first wireless node, a request to join a cluster, the request indicating node information including at least one of location information of the first wireless node, a wake-up schedule of the first wireless node, or a battery status of the first wireless node;
the processing system is configured to determine that the first wireless node is to join the cluster based at least in part on the node information; and
the transceiver is configured to transmit, to the first wireless node, instructions to join the cluster.

22. The apparatus of claim 18, wherein the processing system is configured to determine the first time period and the second time period based on a temporal mapping indicating the relay node in the cluster for a plurality of time periods.

23. The apparatus of claim 22, wherein:
the processing system is configured to generate a relay node configuration indicating the temporal mapping; and
the transceiver is configured to transmit, to the first wireless node, the relay node configuration.

24. The apparatus of claim 23, wherein:
the relay node configuration is dynamic, semi-static, or static over time;
the relay node configuration is based on one or more operating conditions encountered by at least one of the first wireless node or the one or more second wireless nodes, the one or more operating conditions comprise at least one of a power consumption level, a battery level, or an operating temperature; or
the relay node configuration is based on wake-up schedules of at least one of the first wireless node or the one or more second wireless nodes.

25. The apparatus of claim 18, wherein the first wireless node and the one or more second wireless nodes have a same wake-up schedule or different wake-up schedules comprising a wake-up period at multiples of an indicated period.

26. The apparatus of claim 18, wherein the transceiver is configured to:
transmit packets to the first wireless node, wherein at least one of the packets has the one or more second wireless node as a destination; and
receive, from the first wireless node, an uplink payload comprising a first set of packets from the first wireless node and a second set of packets from the one or more second wireless nodes, wherein the first set of packets have a larger payload than the second set of packets, and wherein the first wireless node, the one or more second wireless nodes, and the apparatus communicate via a millimeter wave (mmWave) wireless communication network corresponding to carrier frequencies of 24 GHz to 52.6 GHz or beyond 52.6 GHz.

27. The apparatus of claim 18, wherein the transceiver is configured to receive, from the one or more second wireless nodes, an indication of a data forwarding via the relay node.

28. The apparatus of claim 18, wherein the first wireless node and the one or more second wireless nodes are low-complexity Internet-of-Things (IoT) wireless devices.

* * * * *